US012580372B2

(12) United States Patent
Kell

(10) Patent No.: US 12,580,372 B2
(45) Date of Patent: Mar. 17, 2026

(54) POWER INLET BOX WITH HYBRID CONSTRUCTION

(71) Applicant: Reliance Controls Corporation, Racine, WI (US)

(72) Inventor: Curtis N. Kell, Burlington, WI (US)

(73) Assignee: Reliance Controls Corporation, Racine, WI (US)

( * ) Notice: Subject to any disclaimer, the term of this patent is extended or adjusted under 35 U.S.C. 154(b) by 125 days.

(21) Appl. No.: 18/244,606

(22) Filed: Sep. 11, 2023

(65) Prior Publication Data

US 2024/0088637 A1 Mar. 14, 2024

Related U.S. Application Data

(60) Provisional application No. 63/406,002, filed on Sep. 13, 2022.

(51) Int. Cl.
H02G 3/08 (2006.01)
H02G 3/14 (2006.01)

(52) U.S. Cl.
CPC ............. H02G 3/085 (2013.01); H02G 3/088 (2013.01); H02G 3/14 (2013.01)

(58) Field of Classification Search
CPC .................................. H02G 3/14; H02G 3/081
See application file for complete search history.

(56) References Cited

U.S. PATENT DOCUMENTS

| | | | | |
|---|---|---|---|---|
| 4,058,358 | A | * | 11/1977 | Carlisle ................ H01R 13/447 439/142 |
| 4,343,411 | A | * | 8/1982 | Chesnut ................... H02G 3/14 174/67 |
| D411,826 | S | * | 7/1999 | Lamar .......................... D13/156 |
| 5,984,719 | A | * | 11/1999 | Flegel ................ H01R 13/5202 439/535 |
| 6,184,461 | B1 | | 2/2001 | Flegel |
| 6,369,321 | B1 | | 4/2002 | Flegel |
| 6,564,427 | B1 | | 5/2003 | Flegel |
| 6,674,031 | B1 | | 1/2004 | Flegel |
| 7,148,421 | B2 | * | 12/2006 | Nagashima .............. H02G 3/14 439/35 |
| 7,766,695 | B1 | | 8/2010 | Czarnecki et al. |
| 8,026,443 | B1 | * | 9/2011 | Czarnecki .............. H02G 3/085 220/241 |

(Continued)

*Primary Examiner* — Don M Anderson
(74) *Attorney, Agent, or Firm* — Wong Meyer Smith & McConnell

(57) ABSTRACT

A power inlet box includes a base, a front cover having an opening formed therein that is removably coupled to the base, and a cover cap pivotably connected to the front cover to temporarily cover the opening. The base, front cover, and cover cap define an interior. The base and the front cover may be made of different materials, for instance, a metallic base and a plastic front cover. The base and the front cover may also be made of the same material, such as plastic. Electrical outlet inserts and electrical inlet inserts may be releasably inserted into the opening. When the power inlet box is not being used, the cover cap may be pivoted to a closed position in which the opening is covered. Additionally, a window may be formed in the front cover to enable visual inspection within the box. The window may be substantially translucent or it may be substantially clear.

13 Claims, 7 Drawing Sheets

(56) References Cited

U.S. PATENT DOCUMENTS

| | | | |
|---|---|---|---|
| D662,896 S * | 7/2012 | Czarnecki | .................... D13/156 |
| 9,276,346 B1 * | 3/2016 | Czarnecki | ............ H01R 13/447 |
| 11,677,224 B1 * | 6/2023 | Pettengill, Jr. | ........... H02G 3/10 |
| | | | 174/18 |
| 2006/0016809 A1 * | 1/2006 | Dinh | ........................ H02G 3/14 |
| | | | 220/835 |
| 2009/0211778 A1 * | 8/2009 | Drane | ...................... H02G 3/14 |
| | | | 174/67 |
| 2017/0338635 A1 * | 11/2017 | Stahl | ........................ H05K 3/38 |

* cited by examiner

POWER INLET BOX WITH HYBRID CONSTRUCTION

CROSS-REFERENCE TO RELATED APPLICATION(S)

This application claims priority to U.S. Provisional Patent Application No. 63/406,002, entitled "Power Inlet Box with Hybrid Construction," filed on Sep. 13, 2022, which is herein incorporated by reference.

BACKGROUND OF THE INVENTION

This invention relates to a power inlet box, such as for use in connecting an electrical power generator or other alternate power source to electrical circuitry within a building, and more particularly to a power inlet box having a hybrid construction of at least two component such as a base and a front cover, where the base and front cover may be manufactured from different materials such as plastic and metal.

BRIEF SUMMARY OF THE INVENTION

It is known to connect a power inlet box into the electrical circuitry of a building or other structure. The power inlet box provides a means for supplying electrical power to the building's electrical circuitry from an electrical generator or other alternate power source, such as during a power outage when the primary source of electrical power to the building is unavailable.

A prior art power inlet box is provided that includes multiple components made of metal. Oftentimes, customers preferred metal inlet boxes for the purposes of installation and mounting, as well as for conduit fittings. While this construction is satisfactory, it required multiple pieces that increased assembly time and made the device overly complicated to manufacture, ship, and install. Additionally, use of a fully metal inlet box prevented visual access to the interior of the box.

In accordance with the present invention, a power inlet assembly for securement to a structure includes a base, a front cover that is removably attached to the base and having an opening, and a cover cap that is pivotably coupled to the front cover between a first position where the cover cap covers the opening and a second position where the cover cap is spaced from the opening. An electrical inlet or outlet insert is insertable into the opening. Additionally a cover cap base may be located adjacent to the opening. The cover cap base may be integrally molded with the front cover, otherwise it may be manufactured separately and later installed to the front cover. Further still an gasket, such as an o-ring gasket, may be provided adjacent to the opening that helps secure the insert in place.

The base may include a back wall, a bottom wall, and first and second sidewalls with an open interior. The front cover may include a front wall with the opening formed therein, as well as first and second sidewalls, and a back wall. When secured to the base, the front cover front wall, back wall, and sidewalls enclose a portion of the base. Additionally, at least one window may be formed in the front cover to enable visibility within the assembly. The at least one window may be substantially translucent or it may be clear.

According to one embodiment of the present invention, the base and the front cover may be made of metallic or plastic materials. Additionally, the cover cap may be made of a plastic material. The cover cap base and the front cover may be molded together.

Other aspects, objects, features and advantages of the invention will become apparent to those skilled in the art from the following detailed description and accompanying drawings. It should be understood, however, that the detailed description and specific examples, while indicating preferred embodiments of the present invention, are given by way of illustration and not limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions and instruments shown. Like numerals indicate like elements throughout the drawings. In the drawings.

While the invention is described here in in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION

Figure 8:
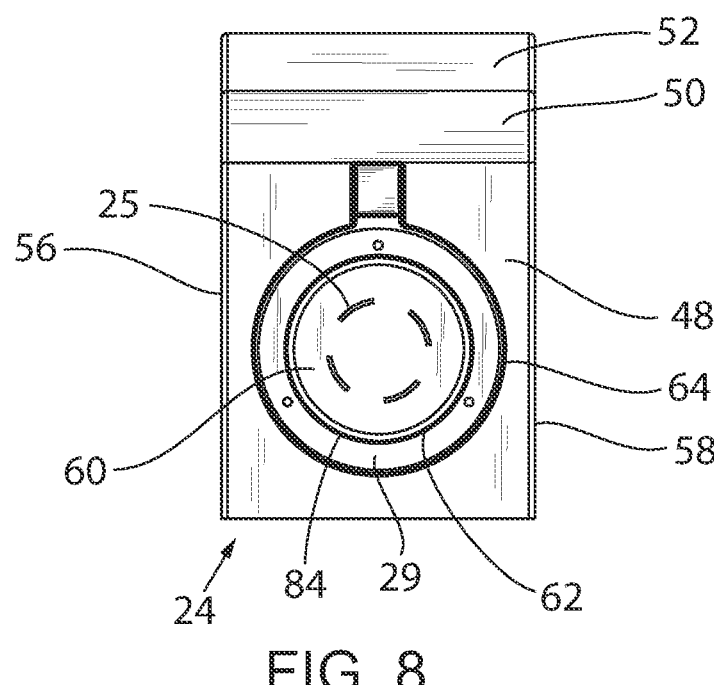
FIG. 8 is a front elevation view of the power inlet box with a first insert.
Figure 9:
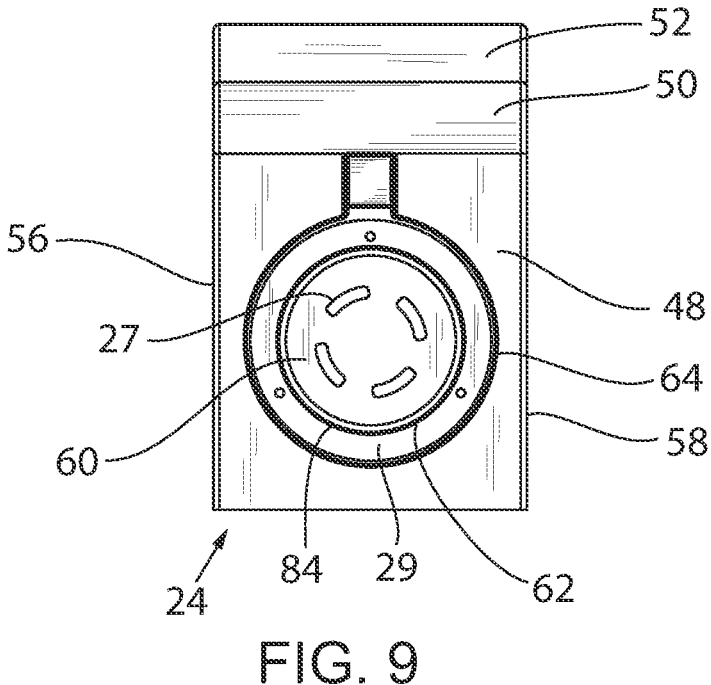
FIG. 9 is a front elevation view of the power inlet box with a second insert.

Referring to the following description in which like reference numerals represent like parts throughout the disclosure, an electrical box assembly in accordance with the present invention is shown generally at 20 in the figures. The electrical box 20 allows a generator or other power source to be connected to a building. Looking initially to FIGS. 1-3 the electrical box 20 includes multiple components that are assembled to make the box, as shown a base 22 and a front cover 24. These components are described as being a "base" and "front" for ease of description with regard to their orientation relative to one another as shown in the figures, but these descriptors should not be deemed as limiting as the electrical box 20 could oriented in any number of different ways. In addition to the base 22 and front cover 24 that are assembled to create the electrical box 20, a cover cap 26 is provided that is rotatable relative to the front cover 24 to enable temporary access to the interior of the electrical box 20. Further still, the electrical box 20 may include a cover cap base 29 as will further be described below. The electrical box 20 includes an inlet insert 25 that is insertable within the electrical box 20 as shown in FIG. 8 and that is accessible when the cover cap 26 is pivoted to an opened position. Alternatively, the electrical box 20 could accommodate an outlet insert 27 that is insertable within the electrical box 20 as shown in FIG. 9, that again is accessible when the cover cap 26 is pivoted to the opened position. Other inserts may be used with the electrical box 20 as desired.

Figure 4:
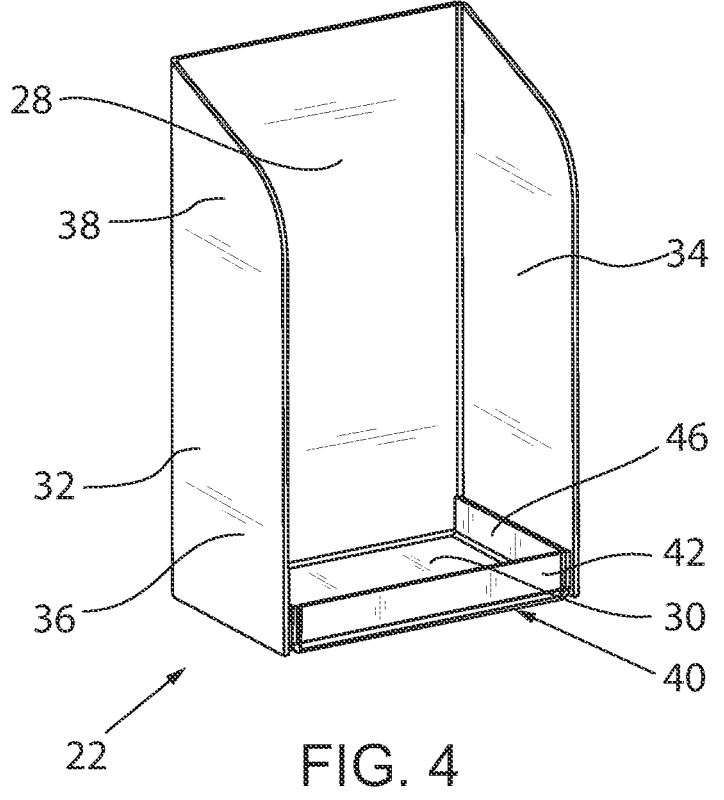
FIG. 4 is an isometric view of a base of the power inlet box of FIGS. 1-3.
Figure 5:
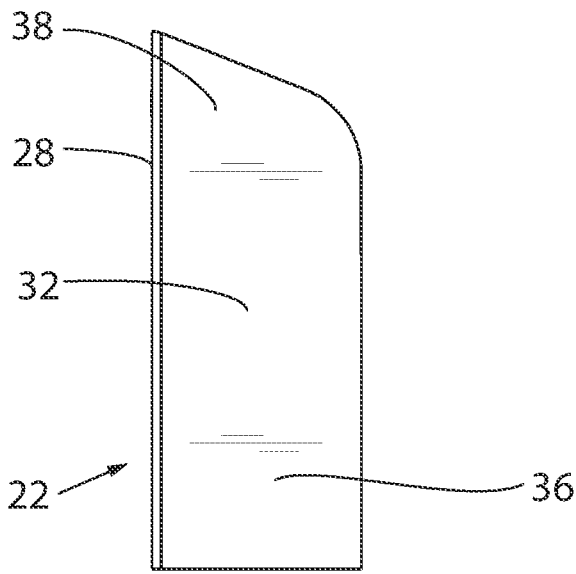
FIG. 5 is a side elevation view of the base of FIG. 4.

Turning to FIGS. 4 and 5, the base 22 is shown in greater detail in isolation. As illustrated, the base 22 includes a back wall 28, a bottom wall 30, and a pair of sidewalls 32, 34. The sidewalls 32, 34 extend in a forward direction from the back wall 28, with one of the sidewalls 32 extending along a first side of the bottom wall 30 and the other sidewall 34 extending along a second side of the bottom wall 30. The sidewalls 32, 34 both have a side profile including an extended rectangular section 36, with an angled, sloped upper section 38 that tapers toward and terminates at the top of the back wall 28. The back wall 28 is substantially rectangular in shape and extends in a substantially vertical direction from the bottom wall 30 to the termination of the upper section 38 of the sidewalls 32, 34. Similarly, the bottom wall 30 is substantially rectangular in shape and extends in a substantially horizontal direction from the back wall 28 to the front of the sidewalls 32, 34. Additionally, the base 22 may include a bottom shelf 40 extending from the bottom wall 30. The illustrated bottom shelf 40 includes a front lip 42 extending from sidewall 32 to sidewall 34, as well as reinforced sides 44, 46 that are connected to the sidewalls 32, 34.

Figure 6:
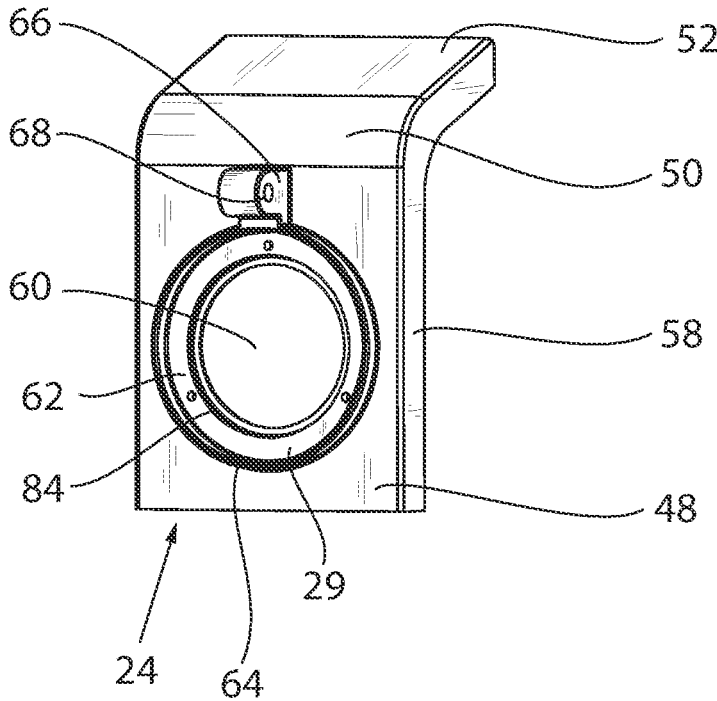
FIG. 6 is a front isometric view of a front cover of the power inlet box of FIGS. 1-3.
Figure 7:
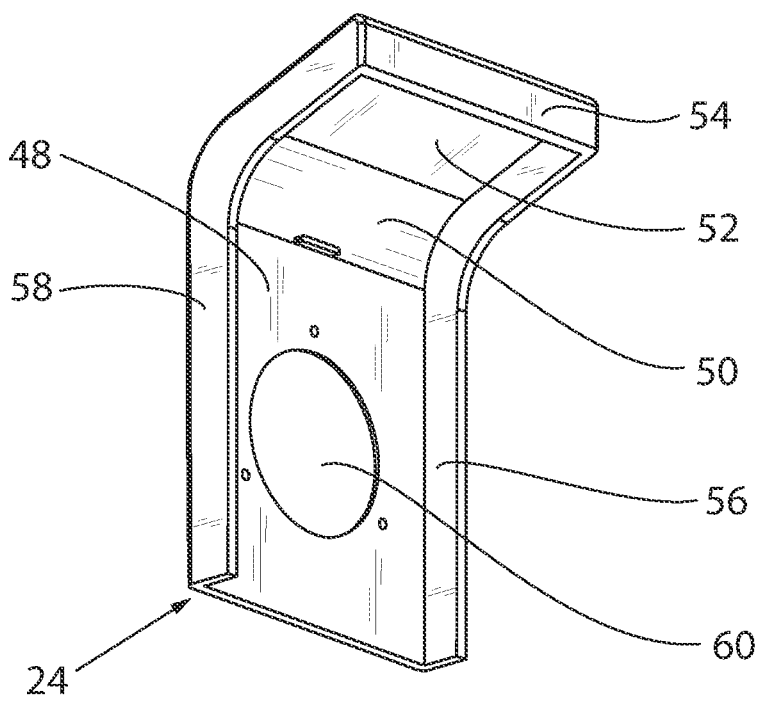
FIG. 7 is a rear isometric view of the front cover of FIG. 6.

Turning next to FIGS. 6 and 7, the front cover 24 is shown in more detail. The front cover 24 includes a front wall 48, a rounded transition wall 50 extending from the top of the front wall 48, an angled top wall 52 extending from the rounded transition wall 50, a back wall 54 that extends downwardly from the angled top wall 52, and first and second sidewalls 56, 58. The illustrated front wall 48 is substantially rectangular in shape, with an opening 60 formed therein having at least one lip 62 extending from the front wall 48 directly adjacent to the opening 60 that will further be described below. The cover cap base 29 is located about the lip 62, with the cover cap 26 contacting the cover cap base 29 when the electrical box 20 is in a closed position. The cover cap base 29 may be molded with the front cover 24, resulting in a simplified design having fewer pieces. Otherwise, the cover cap base 29 may be separately manufactured and then installed relative to the front cover 24. The illustrated opening 60 is circular in shape, although the opening could be in any desired shape. Additionally, a ridge 64 extends around the exterior of the lip 62. The front wall 48 further has an attachment bracket 66 extending therefrom having a hole 68, all of which will also be described below. The rounded transition wall 50 extends from the top edge of the front wall 48 at an angle of less than 90 degrees relative to the horizontal, more preferably between 35-55 degrees relative to the horizontal, and even more preferably approximately 45 degrees relative to the horizontal. The top wall 52 extends from the rounded transition wall 50 and is substantially rectangular in shape such that the top wall 52 extends at the angle at which the rounded transition wall 50 terminates. As a result of the orientation and slope of the rounded transition wall 50 and the top wall 52, rain, snow, and any other accumulated moisture will naturally drip down the rounded transition wall 50 and the top wall 52 and off of the front cover 24. As illustrated, the back wall 54 extends downwardly from the top wall 52 in a substantially vertical direction. The sidewalls 56, 58 extend along opposite sides of the front wall 48, the rounded transition wall 50, and the angled top wall 52 to the back wall 54. Thus, the sidewalls 56, 58 extend along the profile of the front cover 24. The opening 60 is configured to receive an inlet insert 25 or an outlet insert 27 as desired by a particular user.

Figure 1:
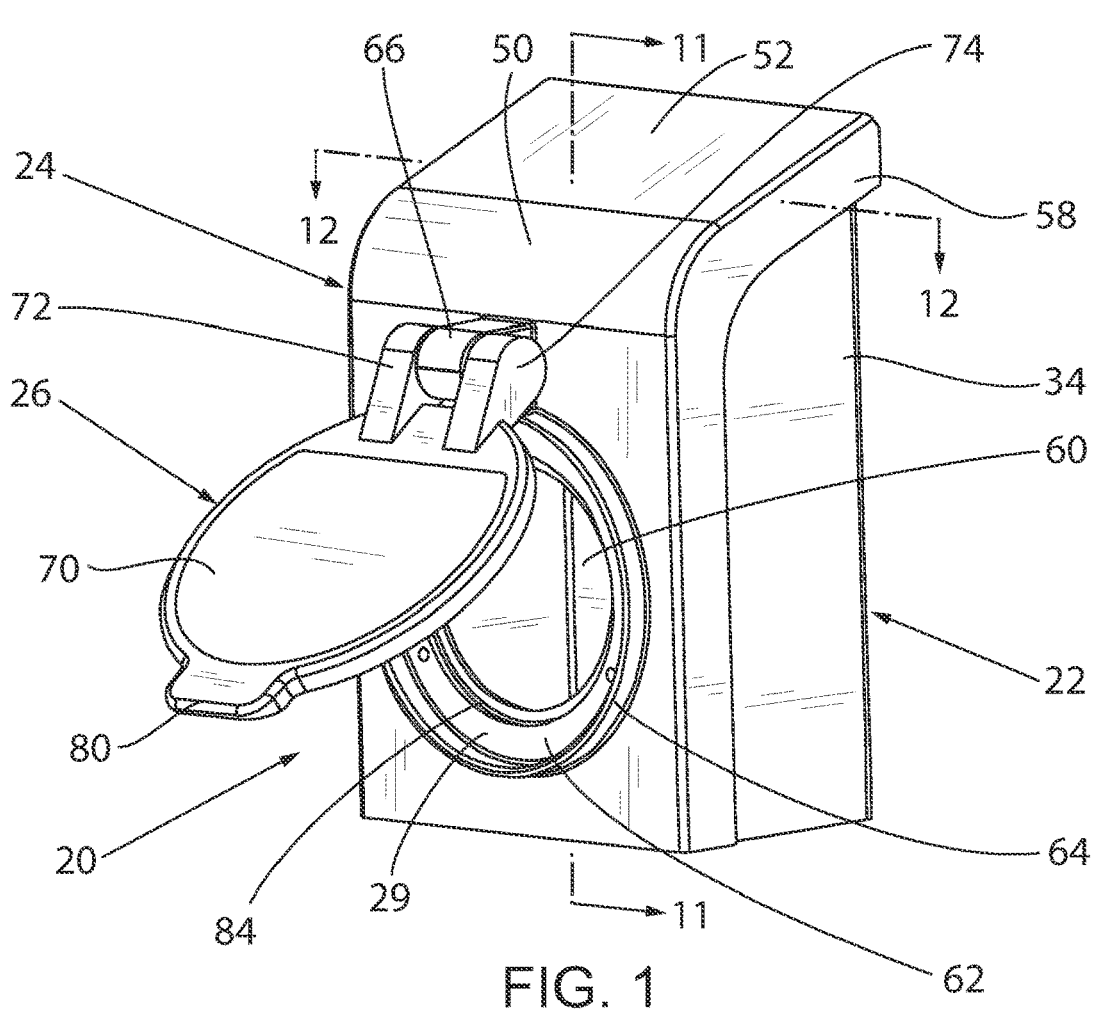
FIG. 1 is an isometric view of a power inlet box having a hybrid construction in accordance with the present invention.
Figure 11:
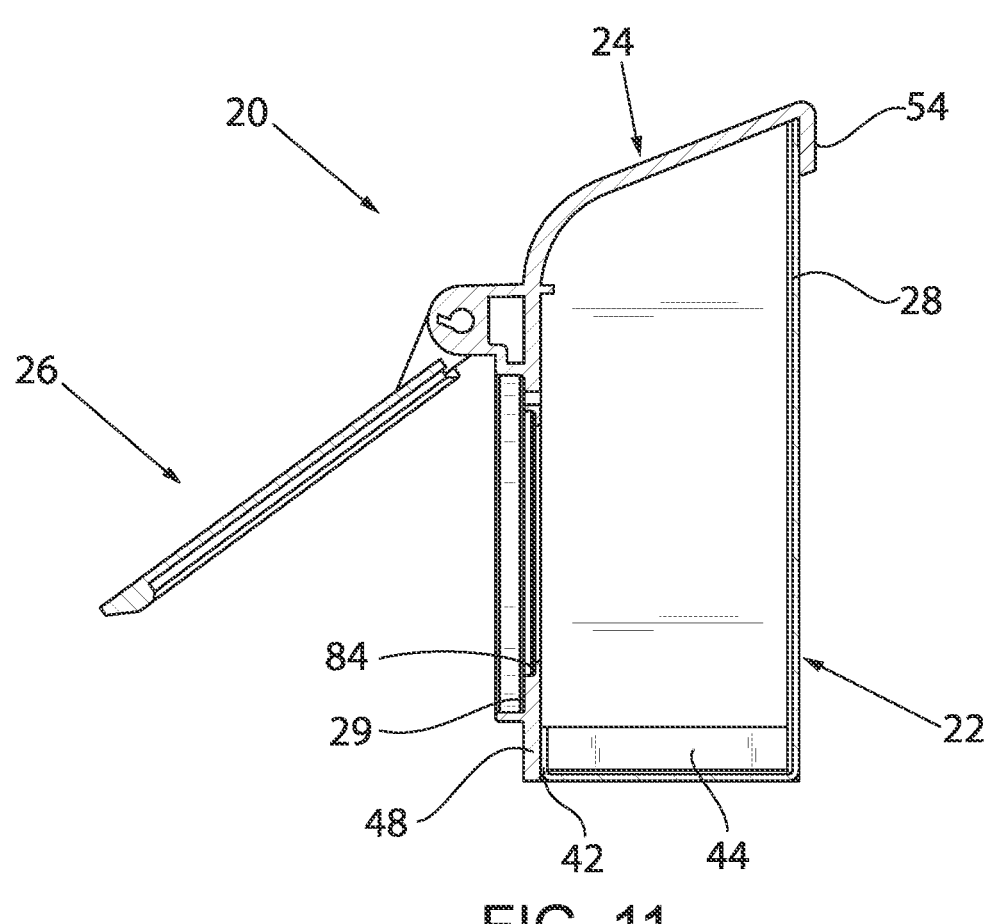
FIG. 11 is a side sectional view of the power inlet box taken about line 11-11 of FIG. 1.
Figure 12:
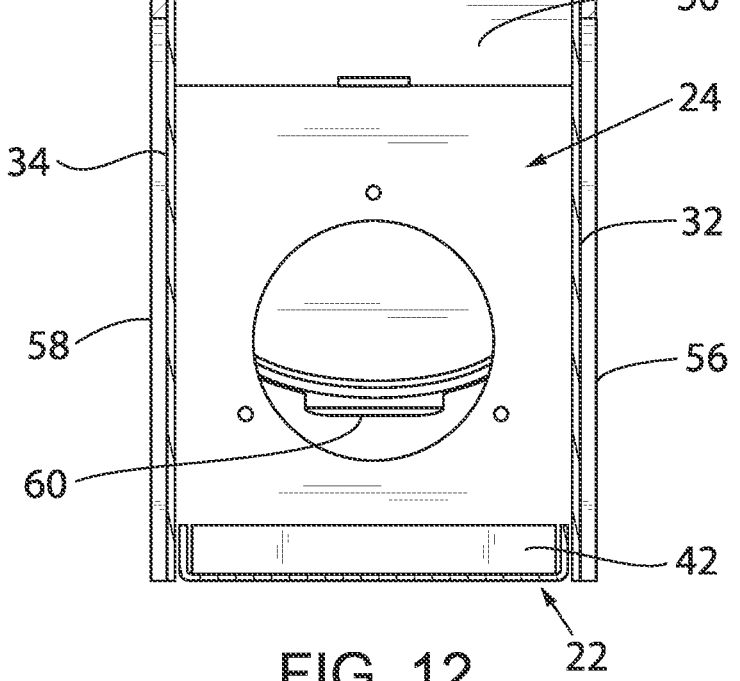
FIG. 12 is a rear sectional view of the power inlet box taken about line 12-12 of FIG. 1.

As can be seen in FIGS. 11 and 12 which are sectional views taken through the side and rear of the electrical box 20 about lines 11-11 and 12-12 of FIG. 1, the dimensions and profile of the base 22 and front cover 24 are configured such that portions of the base 22 nest within the front cover 24. More specifically, the distance between the sidewalls 56, 58 of the front cover 24 is slightly greater than the distance of the sidewalls 32, 34 of the base 22, such that a portion of the base 22 sidewalls 32, 34 are located within the sidewalls 56, 58 of the front cover 24 when the device is assembled as seen in FIG. 12. Additionally, the back wall 28 of the base 22 is configured to be located within the back wall 54 of the front cover 24, while the front lip 42 of the base 22 is located within the front wall 48 of the front cover 24 when the device is assembled as seen in FIG. 11. In this way, the base 22 and the front cover 24 create a snug fitting, secure assembly where the respective components remain in position relative to one another once assembled. In practice, the base 22 may be initially installed to a building B, after which the front cover 24 can quickly and easily be installed onto the base 22 based on the dimensions and proportions of each component, as described above and as seen in FIG. 3. Alternatively, the base 22 and front cover 24 may be installed as a unit.

Figure 10:
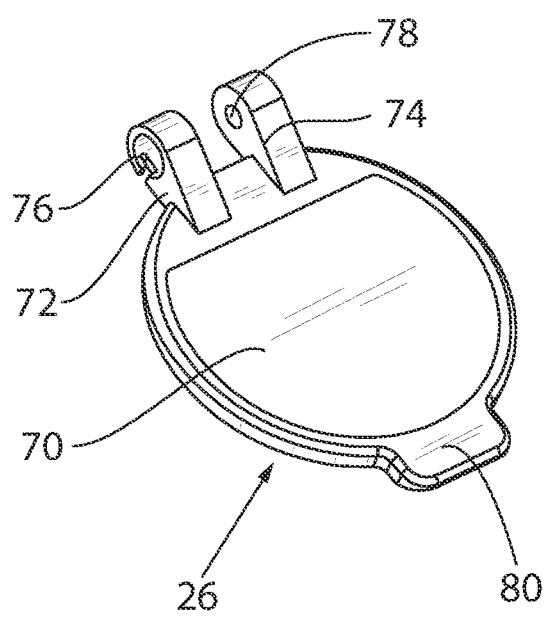
FIG. 10 is an isometric view of a cover cap of the power inlet box of FIGS. 1-3.

The electrical box 20 also includes the cover cap 26 shown in FIG. 10 that is pivotable/rotatable about the front cover 24. The pivotable cover cap 26 includes a body 70 configured to cover the opening 60 formed in the front cover 24. The cover cap 26 is configured to be in the same general shape and size as the opening 60 so as to provide closure of the opening 60. The pivotable cover cap 26 also has first and second mounting brackets 72, 74 extending from the body 70. The mounting brackets 72, 74 have holes 76, 78 formed therein. The mounting brackets 72, 74 are configured to be pivotably attached to the attachment bracket 66 of the front cover 24. More specifically, a bolt, rod, pin or the like (not shown) extends through the holes 68, 76, 78 formed in the attachment and mounting brackets 66, 72, 74. Of course, the mounting brackets 72, 74 could similarly include knobs or other extension sections formed with the brackets 72, 74 that engage with the hole 68 of the bracket 66.

Figure 2:
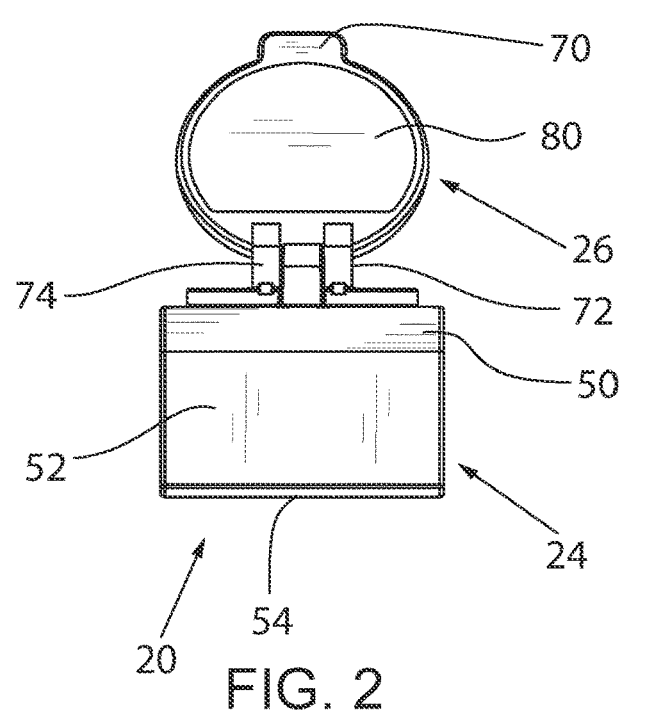
FIG. 2 is an top plan view of the power inlet box as shown in FIG. 1.
Figure 3:
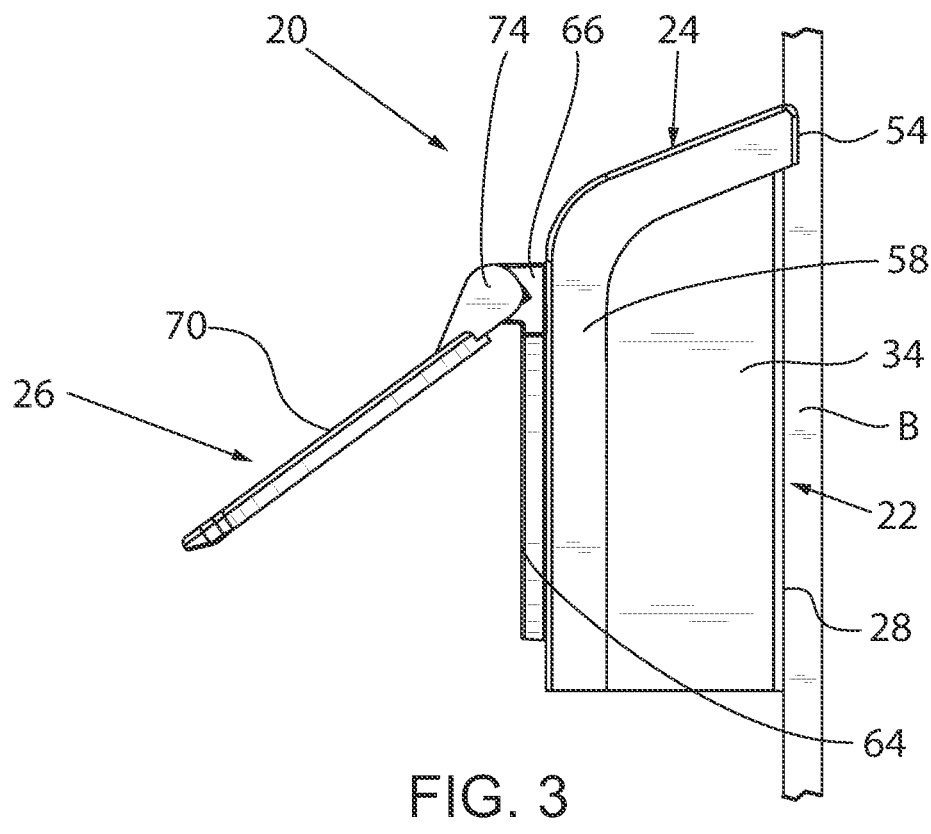
FIG. 3 is a side elevation view of the power inlet box as shown in FIGS. 1 and 2.

Additionally, the front cover 24 and cover cap 26 can both be made of plastic material. Alternatively, the mounting brackets 72, 74 of the cover cap 26 are also made of plastic and thus the brackets 72, 74 and the front cover 24 could be manufactured together as a single part. In any of these embodiments, the pivotable cover cap 26 can be moved from a position in which the opening 60 in the front cover 24 is fully covered by the pivotable cover cap 26 to a position in which the pivotable cover cap 26 is pivoted away from the front cover 24 to expose the interior of the electrical box 20 as shown in FIGS. 1-3.

The various components of the electrical box 20, including for instance the base 22 and the front cover 24, may be made of different materials to improve functionality and assembly of the electrical box 20. For instance, one or both of the base 22 and the front cover 24 may be made of a metallic material or a plastic material. As shown, the base 22 is made of a metallic material, while the front cover 24 is made of a plastic material. Such a configuration is appealing in that the base 22 is what is installed to an existing building, and many users prefer mounting a metallic base 22 to the building, as well as for conduit fitting purposes. For example, the metallic material may be aluminum or stainless steel. In addition to the advantages in the mounting and conduit fitting, use of an aluminum base 22 also eliminates the need for further plating and/or painting. This in turn reduces costs, as well as transportation time. Stainless steel offers many of the same benefits as aluminum, with the addition of an improved and more expensive-looking visual appearance.

Figure 13:
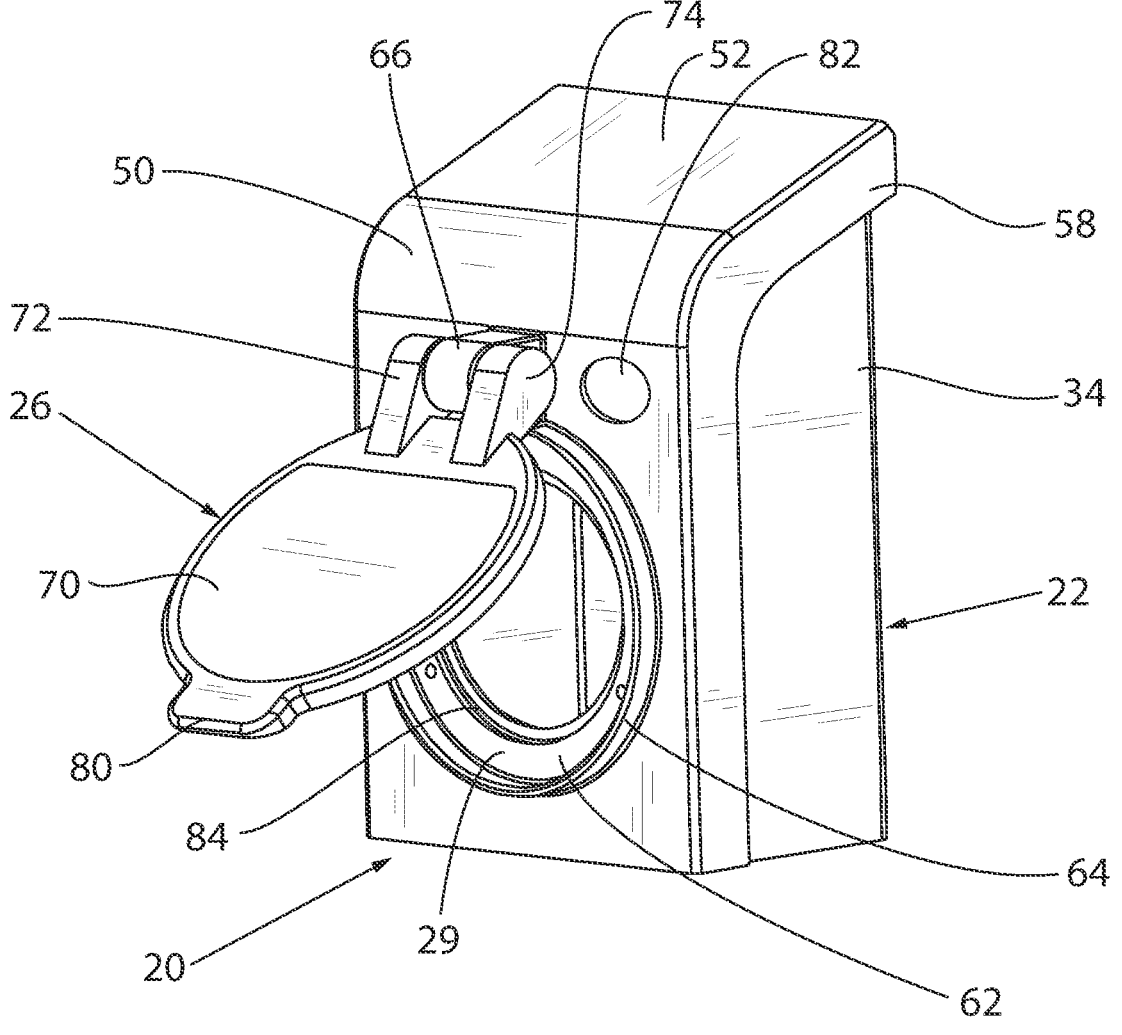
FIG. 13 is an isometric view of a power inlet box having a window.

Similarly, use of a front cover 24 made of plastic provides further advantages. For instance, the plastic front cover 24 advantageously may be monolithically molded with the opening 60, cover cap base 29, lip 62, ridge 64 and attachment bracket 64, which reduces the number of parts, assembly time, and the like. Additionally, use of a plastic material allows the front cover 24 to be molded of translucent material. This would allow the interior of the electrical box 20 to include a source of illumination, which in turn allows for visual inspection of the interior of the electrical box 20. The source of illumination may also provide visual indication of a desired configuration, for instance providing a light when an associated generator (not shown) is supplying the electrical box 20 with power. While the entire front cover 24 may be made of the translucent material, alternatively a window 82 shown in FIG. 13 having a translucent or clear material may be provided to provide illumination during operation and/or to enable visual inspection within the interior of the electrical box 20. The electrical box 20 may be further customized with the window 82 including a logo, text, or other graphical information (not shown), as desired. Other embodiments of the electrical box 20 include a base 22 and front cover 24 that are both made of plastic material.

The electrical box 20 is configured to accommodate a variety of different electrical configurations, including amperages of 30 amps, 50 amps, or any other amperages as may be desired by a user.

Installation of the electrical box 20 will now be described. Initially, the base 22 is installed relative to a building B. Next, the front cover 24 is installed to create the electrical box 20 described above. This can quickly and easily be completed with minimal or no tools based on the dimensions and proportions of the front cover 24 and base 22 as described above. In embodiments where the cover cap base 29 is not molded with the front cover 24, the cover cap base 29 can then be installed relative to the front cover 24. The pivotable cover cap 26 may then be opened and closed to allow for access to the interior of the electrical box 20, and more specifically to grant access to the inlet 25 or outlet 27 inserts that are contained within the box 20. An o-ring gasket 84, foam gasket, or the like may be provided about the lip 62 adjacent to the opening 60 that enable an inlet insert 25 or outlet insert 27 to be sealed relative to the opening 60 in the front cover 24 such that water, moisture, and other materials are prevented from entry into the electrical box 20 once the inlet insert 25 or outlet insert 27 have been installed.

It can thus be appreciated that the present invention provides a versatile construction for an electrical box using a very small number of components. The components used to construct the electrical box can themselves be formed of relatively inexpensive materials using relatively inexpensive tooling and forming processes, which results in a very low cost yet versatile electrical box construction.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed, and defined herein, extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

The invention claimed is:

1. An electrical box enclosure, comprising:
a base comprising a back wall, a bottom wall, first and second sidewalls, and an open interior;
a front cover comprising a front wall with an opening formed therein, and first and second sidewalls; and
a cover cap comprising a body pivotably coupled to the front cover and movable between:
a first position in which the body covers the opening; and
a second position in which the body is spaced from the opening to expose the interior;
wherein the front cover is formed of a molded plastic material and includes an integrally formed cover cap base, wherein the cover cap base includes an annular ridge that surrounds the opening in the front wall of the front cover, and a cover cap attachment member to which the cover cap is pivotably mounted for movement between the first and second positions, wherein the annular ridge and the cover cap attachment member are formed integrally with the front wall of the front cover;
wherein the front cover is configured to be removably attached to the base.

2. The electrical box enclosure of claim 1, wherein the base is comprised of a metallic material.

3. The electrical box enclosure of claim 1, further comprising an electrical connection member that is accessible through the opening formed in the front cover.

4. The electrical box enclosure of claim 3, further comprising an o-ring gasket mounted adjacent to the opening;
wherein the electrical inlet is secured within the opening using the o-ring gasket.

5. The electrical box enclosure of claim 1, wherein the front cover further comprises a back wall;
wherein when the front cover is removably attached to the base, the front wall, the back wall, and the first and second sidewalls of the front cover enclose the interior of the base.

6. The electrical box enclosure of claim 1, further comprising an illumination source enclosed by the base and the front cover, and at least one window formed in the front cover that enables light from the illumination source to be emitted to the exterior of the electrical box enclosure.

7. The electrical box enclosure of claim 6, wherein the window is substantially translucent.

8. The electrical box enclosure of claim 6, wherein the window is substantially clear.

9. An electrical enclosure, comprising:

a metallic base comprising a back wall, a bottom wall, and first and second sidewalls;

a plastic front cover comprising a front wall with an opening formed therein; and a cover cap pivotably coupled to the front cover and movable between:

a first position in which the body covers the opening;

a second position in which the body is spaced form the opening to expose an interior; and an electrical connection member that is positioned within the opening;

wherein the front cover is configured to be removably attached to the base;

wherein the front cover is formed of a molded plastic material and includes an integrally formed cover cap base, wherein the cover cap base includes an annular ridge that surrounds the opening in the front wall of the front cover, and a cover cap attachment member to which the cover cap is pivotally mounted for movement between the first and second positions, wherein the annular ridge and the cover cap attachment member are formed integrally with the front wall of the front cover.

10. The electrical enclosure of claim 9, further comprising an o-ring gasket positioned about the opening, wherein the o-ring gasket creates a seal between the electrical connection member and the front wall of the front cover.

11. The electrical enclosure of claim 9, further comprising an illumination source enclosed by the metallic base and the plastic front cover;

wherein the plastic front cover is substantially translucent such that light from the illumination source is emitted through the translucent front cover to the exterior of the electrical enclosure.

12. The electrical enclosure of claim 9, further comprising:

an illumination source enclosed by the metallic base and the plastic front cover; and a window formed in the plastic front cover such that light from the illumination source is emitted through the window to the exterior of the electrical enclosure.

13. The electrical enclosure of claim 12, wherein the window is substantially clear.

\* \* \* \* \*